United States Patent [19]
Nakamoto

[11] Patent Number: 5,793,898
[45] Date of Patent: Aug. 11, 1998

[54] DATA COMPRESSING SYSTEM

[75] Inventor: Nobuya Nakamoto, Tokyo, Japan

[73] Assignee: NEC Corporation, Tokyo, Japan

[21] Appl. No.: 622,845

[22] Filed: Mar. 27, 1996

[30] Foreign Application Priority Data

Oct. 31, 1994 [JP] Japan .................. 6-290677

[51] Int. Cl.⁶ .................................. G06K 9/00
[52] U.S. Cl. ............................ 382/250; 382/246
[58] Field of Search ........................ 382/250, 238, 382/239, 232, 233, 234, 235, 236, 240, 241, 224, 243, 244, 245, 246, 248, 251, 252, 253, 276, 254; 348/384, 409, 408, 469, 405; 358/427, 432, 261.3, 430, 433, 426; 371/49.1, 53

[56] References Cited

U.S. PATENT DOCUMENTS

| | | | |
|---|---|---|---|
| 5,136,376 | 8/1992 | Yagasaki et al. | 358/133 |
| 5,166,987 | 11/1992 | Kageyama | 382/56 |
| 5,184,229 | 2/1993 | Saito et al. | 358/427 |
| 5,321,440 | 6/1994 | Yanaguhara et al. | 348/408 |
| 5,481,554 | 1/1996 | Kondo | 371/53 |
| 5,515,388 | 5/1996 | Yagasaki | 371/49.1 |

FOREIGN PATENT DOCUMENTS

| | | | |
|---|---|---|---|
| 4-48874 (A) | 2/1992 | Japan | H04N 1/41 |
| 4-266286 (A) | 9/1992 | Japan | H04N 7/14 |
| 4-329089 (A) | 11/1992 | Japan | H04N 7/137 |
| 4-331592 (A) | 11/1992 | Japan | H04N 7/137 |

*Primary Examiner*—Leo Boudreau
*Assistant Examiner*—Bijan Tadayon
*Attorney, Agent, or Firm*—Laff, Whitesel, Conte & Saret, Ltd.

[57] ABSTRACT

In a code compressing system for determining a quantizing step of a image compressing code, a second DCT calculating portion performs a DCT calculation for each element reduced and divided by a picture dividing portion. A second quantizing portion quantizes the calculated result with the maximum value of quantizing steps of an applicable system. A third quantizing portion quantizes the calculated result with the minimum value of the quantizing steps of the applicable system. A code amount controlling portion determines the difference between the code amounts generated by the second quantizing portion and the third quantizing portion for each element divided by the picture dividing portion and obtains an optimum quantizing step corresponding to the determined result, the target compressing ratio, and the target encoding bit rate. A first quantizing portion quantizes the calculated result of a first DCT calculating portion with the optimum quantizing step determined by the code amount controlling portion.

6 Claims, 6 Drawing Sheets

50: BACKGROUND (WALL)
52: PERSON
51: ORIGINAL PICTURE

FIG.2(b)

53: DIVIDED ELEMENT
54: REDUCED PICTURE

FIG.2(c)

| X | X | X | X | ~55 |
| X | Y | Y | X | |
| X | Y | Y | X | |
| X | Y | Y | X | |

FIG. 4
PRIOR ART

FIG.5(a)
PRIOR ART
56:BLOCK DIVIDED REGIONS

57:PICTURE (PERSON)

FIG.5(b)
PRIOR ART

59:ZONE 2

58:ZONE 1

61:PICTURE (PERSON)

DATA COMPRESSING SYSTEM

BACKGROUND OF THE INVENTION

1. Field of the Invention

The present invention relates to a data compressing system for use with a picture compressing apparatus of a still picture, and a picture decompressing apparatus for continuously decompressing a compressed still picture and displaying as a moving picture, in particular, a code amount controlling system corresponding to a data compressing system, and a compressed moving picture encoding apparatus,

2. Description of the Related Art

As data compressing systems for maintaining a compressing ratio and encoding bit rate constant (in other words, a data compressing system with a target compressing ratio and a target encoding bit rate), the following related art reference is known.

As a first related art reference "a data compressing system for repeating a compression encoding process until a target compressing ratio and a target encoding bit rate is accomplished. determining optimum parameters such as quantizing steps, and compressing data corresponding to the parameters" is known.

Figure 4:
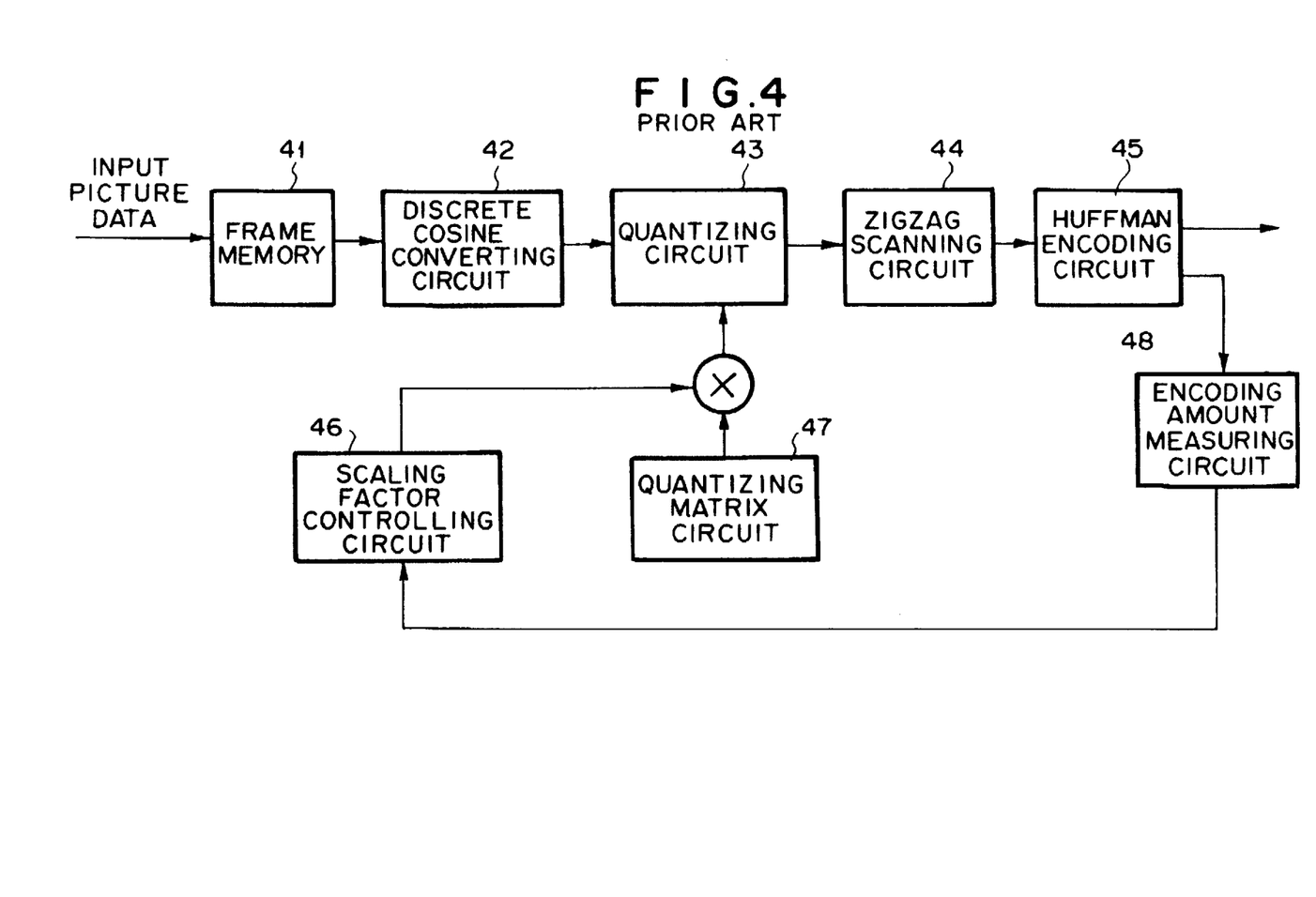
FIG. 4 is block diagram showing a structure of a conventional data compressing system according to a first related art reference.

FIG. 4 is a block diagram showing a structure of a picture data recording system (as disclosed in Japanese Patent Laid-Open Publication No. Hei4-48874) corresponding to the data compressing system of the first related art reference. This picture data recording system comprises a frame memory 41, a discrete cosine converting circuit 42, a quantizing circuit 43, a zigzag scanning circuit 44, a Huffman encoding circuit 45, a code amount measuring circuit 48, a scaling factor controlling circuit 46, and a quantizing matrix circuit 47. A quantizing step is defined corresponding to a value based on a scaling factor received from the scaling factor controlling circuit 46.

As a second related art reference, "a data compressing system for dividing a picture into elements and designating a quantizing level of each element as optimum parameters of a target compressing ratio and a target encoding bit rate" is known.

The data compressing system of the second related art reference corresponds to a moving picture encoding apparatus as disclosed in Japanese Patent Laid-Open Publication No. Hei4-321069 and a television telephone picture signal compressing apparatus as disclosed in Japanese Patent Laid-Open Publication No. Hei4-266286.

Figure 5A:
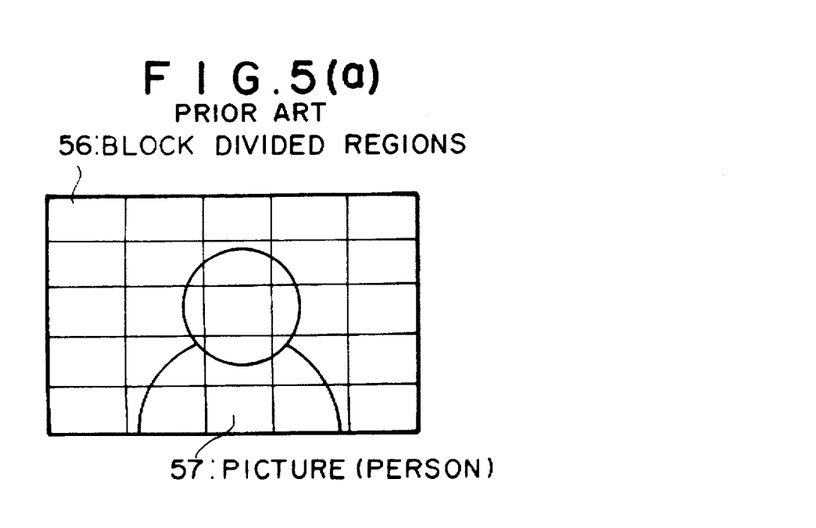
FIGS. 5(a) and 5(b) are schematic diagrams showing the conception of a block division of a data compressing system according to a second related art reference.

FIG. 5(a) is a schematic diagram showing the conception of a block division corresponding to the data compressing system as disclosed in the Japanese Patent Laid-Open Publication No. Hei4-329089. In this case, an original picture (of a person) is divided into rectangular blocks (block divided regions) and optimum quantizing steps thereof are determined.

Figure 5B:
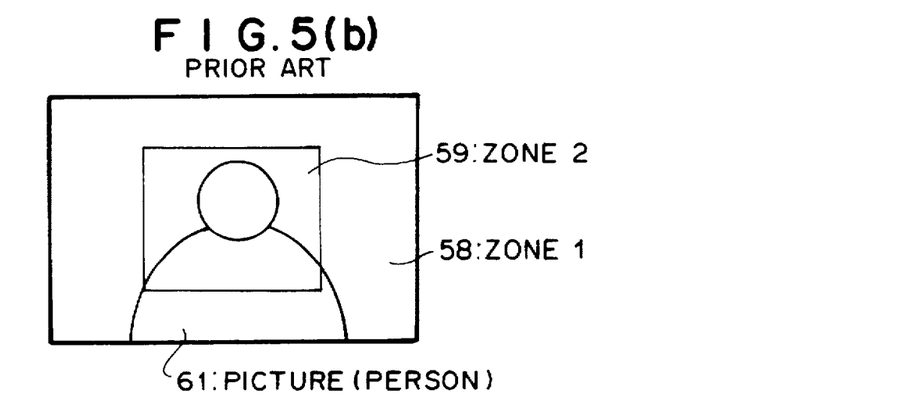

FIG. 5(b) is a schematic diagram showing the conception of a block (zone) division corresponding to the data compressing system as disclosed in the Japanese Patent Laid-Open Publication No. Hei4-266286. In this system, an application for a television telephone system is supposed. Referring to FIG. 5(b), a person is disposed at the center portion of the screen. The center portion 59 (zone 2) is finely quantized, whereas the periphery (zone 1) thereof is coarsely quantized. In such a manner, the entire code amount of the picture is controlled.

Figure 6:
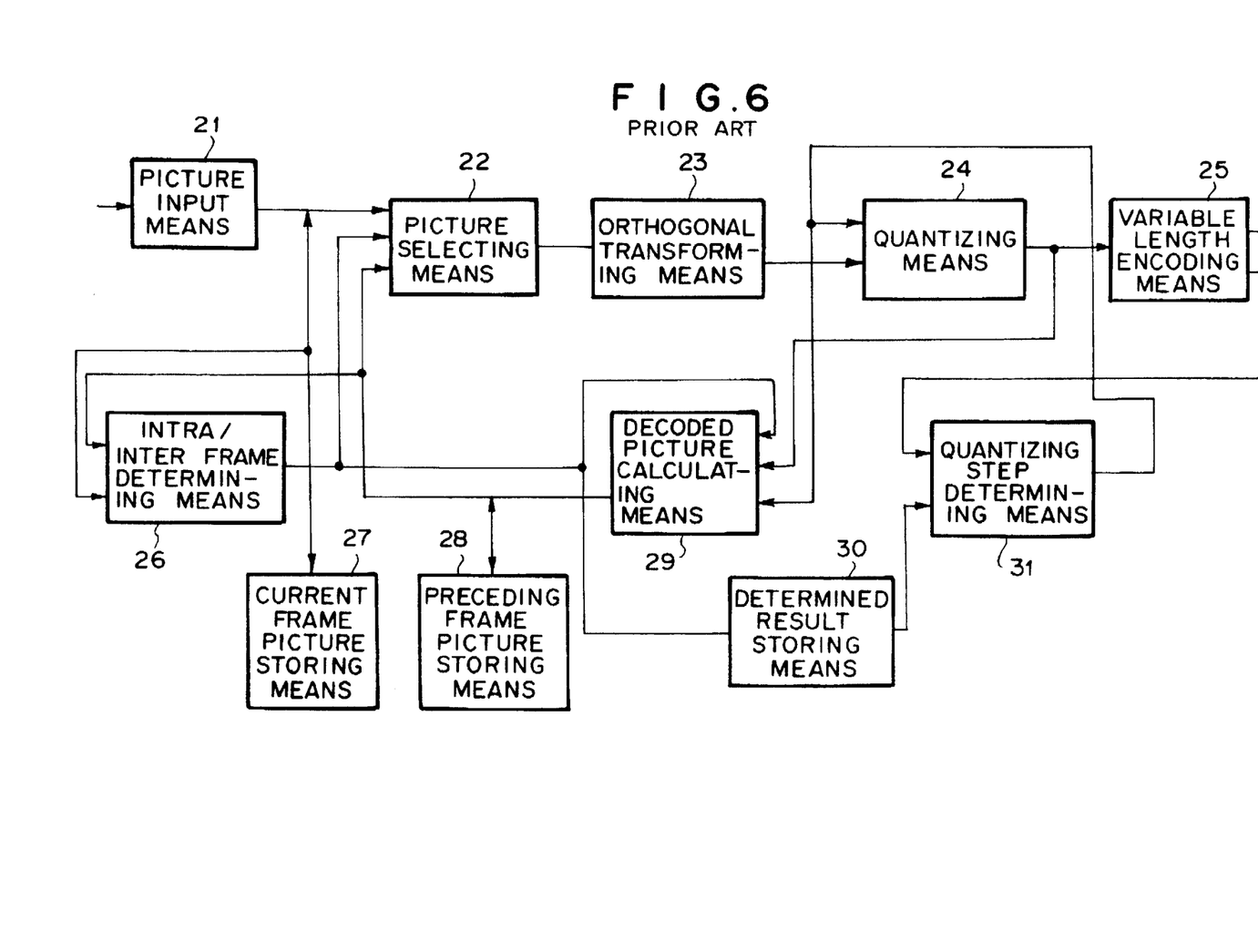
FIG. 6 is a block diagram (functional block diagram) showing a structure of a conventional data compressing system according to the third related art reference.

As a third related art referenced, FIG. 6 is a block diagram (functional block diagram) of a moving picture encoding

2 apparatus as disclosed in Japanese Patent Laid-Open Publication No. Hei4-331592 that provides a more detail structure than the above-described related art reference as disclosed in the Japanese Patent Laid-Open Publication No. Hei4-329089. This moving picture encoding apparatus as disclosed in Japanese Patent Laid-Open Publication No. Hei4-331592 comprises a picture input means 21, a picture selecting means 22, an orthogonal transforming means 23, quantizing means 24, a variable length encoding means 25, an intra/inter-frame determining means 26, a current frame picture storing means 27, a preceding frame picture storing means 28, a decoded picture calculating means 29, a determined result storing means 30, and a quantizing step determining means 31. In this moving picture encoding apparatus, when data amount (code amount) that is encoded in a particular time period is larger than a predetermined reference code amount (target code amount), the quantizing step is increased so as to suppress the generated code amount. On the other hand, when a particular code amount is smaller than the predetermined reference code amount, the quantizing step is decreased so an to increase the generated code amount.

In the data compressing system of the first related art reference, data should be fed back several times so that the generated code amount is smaller than the target code amount. Thus, this system is effective for an apparatus that deals with still pictures that are not required to be processed on real time base in a predetermined time period (an example of this apparatus is an electronic still picture camera). However, when this system is used for an apparatus that continuously displays still pictures as moving pictures or an apparatus that compresses pictures on real time basis so as to record pictures, it is very difficult to "repeatedly control the feed-back process".

In addition, in the data compressing system of the second related art reference, there are the following problems. In "the system for dividing a frame into zones and encoding each zone with a quantizing steps corresponding thereto" as with the data compressing system disclosed in the Japanese Patent Laid-Open Publication No. Hei4-266286 titled "Picture signal Compressing Apparatus for Use with Television Telephone", this system is effective for a picture of which a person is disposed at the center portion of a screen with a high probability as in a television telephone. However, in this system, when a large object is not disposed at the center portion, picture quality and code amount cannot be optimally obtained and effectively controlled.

And, in the data comressing system of the third related art reference, there are the following problems.

In "the system for dividing a picture into blocks, increasing the quantizing step in the case that the code amount of a divided block is larger than a predetermined target code amount, and decreasing the quantizing stop in the case that the code amount of a divided block is smaller than the predetermined target code amount", unlike with the problem (1), when a person is disposed at the center portion of a picture, the following problem takes place. Since the code amount of the background of a picture is smaller than the target code amount and thereby the quantizing stop is decreased, the picture quality is improved. However, since the code amount at the center portion of the picture is larger than the target code amount and thereby the quantizing stop is increased, the picture quality is deteriorated. Thus the picture quality of the background portion is high, whereas the picture quality of the center portion is low.

In other words, in the conventional data compressing systems, when a particular target compressing ratio and a particular target encoding bit rate should be required, the picture quality is deteriorated.

It is very important in the control field of an image data to "control a code amount while keeping the picture quality in a system that compresses and stores data or a system that transmits data at a predetermined constant encoding bit rate".

SUMMARY OF THE INVENTION

An object of the present invention is to provide a data compressing system for preventing the picture quality from deteriorating even if a predetermine constant compressing ratio or a predetermined constant encoding bit rate are required.

The present invention is a data compressing system, comprising a first DCT calculating portion for performing a DCT calculation for an original picture, a first quantizing portion for quantizing a calculated result of the first DCT calculating portion with an optimum quantizing step determined by a code amount controlling portion, a variable length encoding portion for counting a valid coefficient and a run number of "0" values corresponding to the quantized result of the first quantizing portion and outputting a variable length code corresponding to the counted result, a picture dividing portion for reducing the original picture and dividing it into several elements, a second DCT calculating portion for performing a DCT calculation for the elements divided by the picture dividing portion, a second quantizing portion for quantizing a calculated result of the second DCT calculating portion with the maximum value of quantizing steps of an applicable system, a third quantizing portion for quantizing the calculated result of the second DCT calculating portion with the minimum value of the quantizing steps of the applicable system, and a code amount controlling portion for controlling a quantizing stop of the first quantizing portion for each of the elements corresponding to the difference of the code amount generated by the second quantizing portion and the code amount generated by the third quantizing portion.

In the data compressing system according to the present invention, a first DCT calculating portion performs a DCT calculation for an original picture. A first quantizing portion quantizes the calculated result of the first DCT calculating portion at an optimum quantizing step determined by a code amount controlling portion. A variable length encoding portion counts a valid coefficient and a run number of "0" values corresponding to the quantized result of the first quantizing portion and outputs a variable length code corresponding to the counted result. A picture dividing portion reduces and divides the original picture into several small elements. A second DCT calculating portion performs a DCT calculation for the elements divided by the picture dividing portion. A second quantizing portion quantizes the calculated result of the second DCT calculating portion with the maximum value of the quantizing steps of an applicable system. A third quantizing portion quantizes the calculated result of the second DCT calculating portion with the minimum value of the quantizing steps of the applicable system. The code amount controlling portion determines the difference between the code amount generated by the second quantizing portion and the code amount generated by the third quantizing portion for each element divided by the picture dividing portion and determines an optimum quantizing step for each element corresponding to the result, the target compressing ratio, and the target encoding bit rate.

According to the present invention, a generation code amount is predicted beforehand for a reduced picture of an original picture. In addition, an optimum quantizing step for each element of the reduced and divided picture is determined corresponding to "the difference between the code amount generated with the maximum quantizing step and the code amount generated with the minimum quantizing step", a large (high) quantizing step can be designated to an element with a mono-chrome pattern, whereas a small (low) quantizing step can be designated to an element with a fine pattern. Thus, even if the predetermined compressing ratio and the predetermined encoding bit rate are required, the picture quality can be prevented from deteriorating.

These and other objects, features and advantages of the present invention will become more apparent in light of the following detailed description of a best mode embodiment thereof, as illustrated in the accompanying drawings.

DESCRIPTION OF THE PREFERRED EMBODIMENT

An embodiment of the present invention will be described in detail, with reference to the accompanying drawings.

Figure 1:
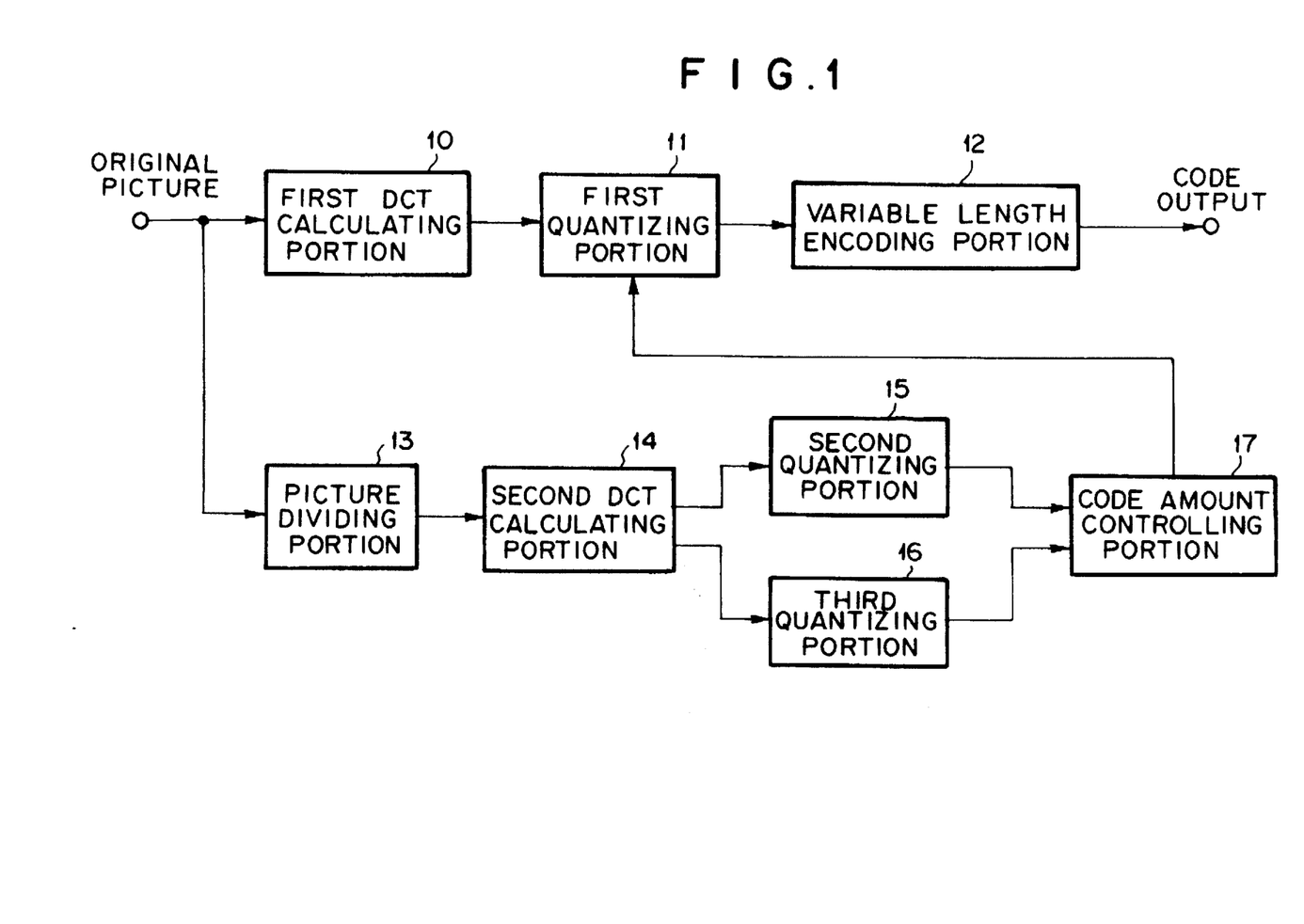
FIG. 1 is a block diagram showing a structure of a data compressing system according to an embodiment of the present invention.

FIG. 1 is a block diagram showing a data compressing system according to an embodiment of the present invention. In the system, an original picture contains a luminance signal (Y) and color difference signals ($C_R$) and ($C_B$) at a predetermined ratio.

The data compressing system according to the embodiment comprises a first DCT calculating portion 10, a first quantizing portion 11, a variable length encoding portion 12, a picture dividing portion 13, a second DCT calculating portion 14, a second quantizing portion 15, a third quantizing portion 16, and a code amount controlling portion 17.

Figure 2A:
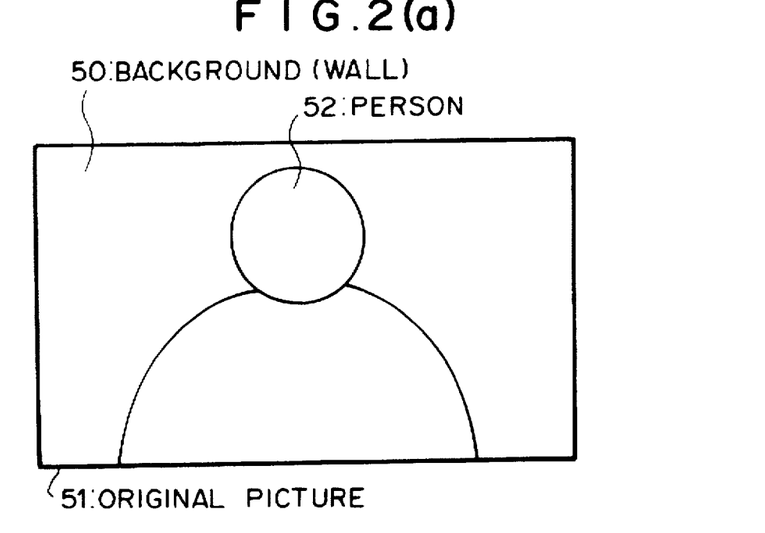
FIGS. 2(a) to 2(c) are schematic diagrams showing the conception of a process in the data compressing system shown in FIG. 1.
Figure 2B:
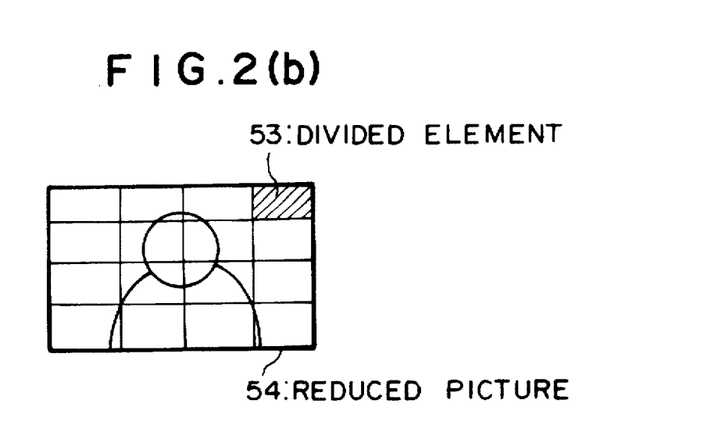
Figure 2C:
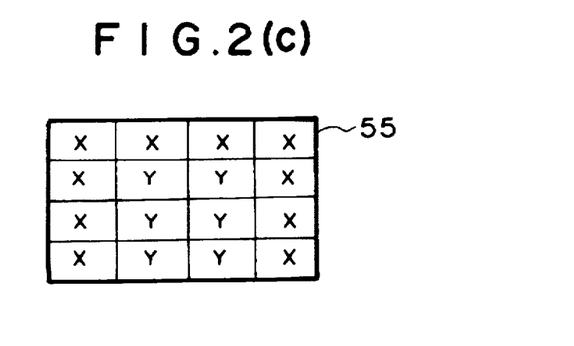

FIGS. 2(a) to 2(c) are schematic diagrams showing the conception of a process of the data compressing system according to the embodiment of the present invention.

Figure 3:
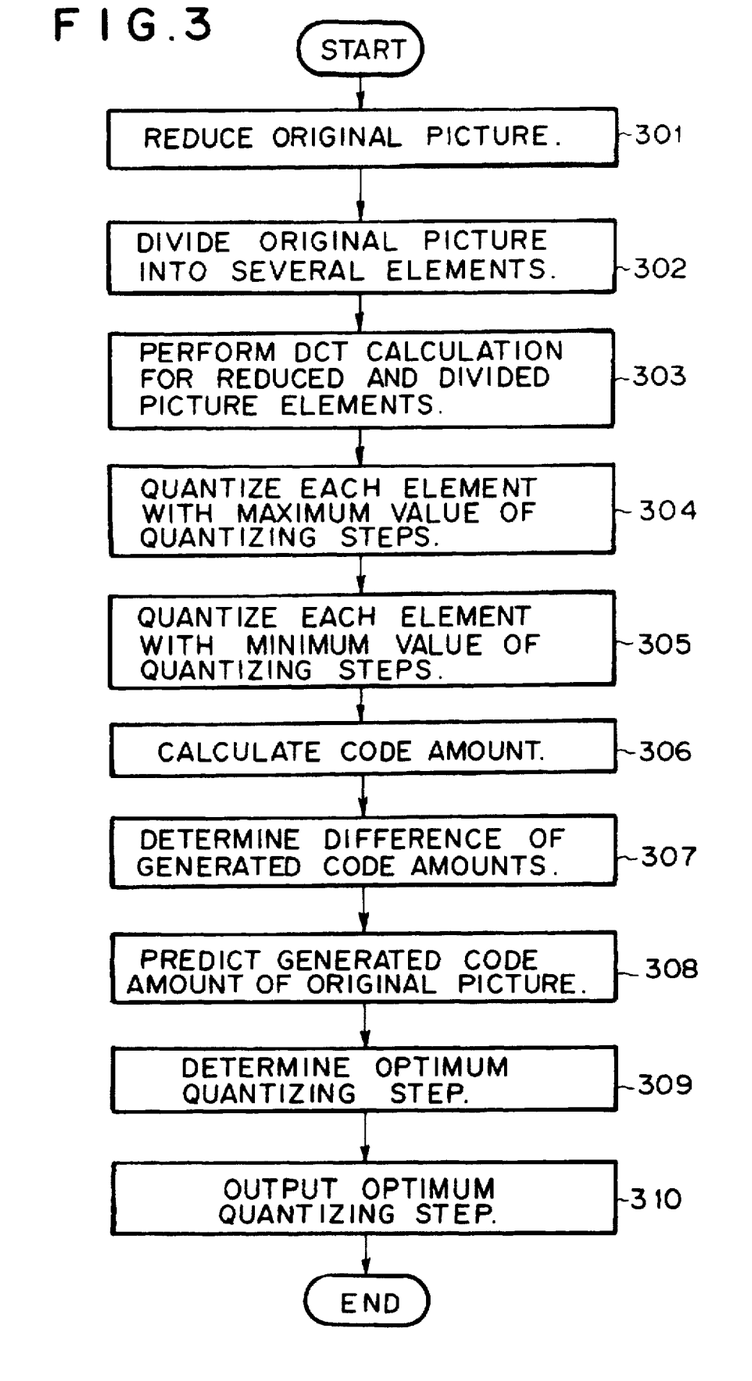
FIG. 3 is a flow chart showing an optimum quantizing stop determining process in the data compressing system shown in FIG. 1.

FIG. 3 is a flow chart showing an optimum quantizing step determining process (for determining "an optimum quantizing step" used in the first quantizing portion 11) of the data compressing system according to the embodiment. This process comprises an original picture reducing step 301, a picture dividing step 302, a DCT calculating step 303, a maximum value quantizing stop 304, a minimum value quantizing step 305, a code amount calculating step 306, a generated code amount difference determining step 307, an original picture generated code amount estimating step 308, an optimum quantizing step determining step 309, and an optimum quantizing step providing step 310.

Next, the operation of the data compressing system according to the embodiment will be described.

An original picture is supplied to the first DCT calculating portion 10.

The first DCT calculating portion 10 performs an DCT calculation for the original picture and converts the original picture into data of frequency components.

Thereafter, the first quantizing portion 11 quantizes the calculated result (data of frequency components) of the DCT calculation by the first DCT calculating portion 10 with "an optimum quantizing step determined by the code amount controlling portion 17" (that will be described later).

The variable length encoding portion 12 successively zigzag-scans each DCT coefficient Fij (8×8 blocks) quantized by the first quantizing portion 11 from low order coefficients to high order coefficients and designates variable length codes corresponding to the counted result of a valid coefficient (without "1" values) and a run number of "0" values and converts the resultant data into two-dimensional data. Thereafter, the resultant data is encoded into Huffman code by a Huffman encoding circuit. Thus, the variable length encoding portion 12 outputs a code. This code is recorded On recording mediums such as an IC card, a VCR, and a DVD and also output to a wireless/wired transmission system.

On the other hand, the original picture is also supplied to the picture dividing portion 13. In the process shown in FIG. 3 (optimum quantizing step determining process), an "optimum quantizing step" used in the first quantizing portion 11 is determined. Next, the process shown in FIG. 3 will be described step by step.

When the original picture is supplied to the picture dividing portion 13, it reduces the original picture (at step 301). Thereafter, the picture dividing portion 13 divides the reduced picture into several elements (at step 302).

The second DCT calculating portion 14 performs a DCT calculation for the picture elements reduced and divided by the picture dividing portion 13 (at step 303).

The result of the DCT calculation performed by the second DCT calculating portion 14 is supplied to the second quantizing portion 15 and the third quantizing portion 16.

The second quantizing portion 15 quantizes the calculated result with the maximum value of the quantizing steps in an applicable system corresponding to the data compressing system of the embodiment (at stop 304).

The third quantizing portion 16 quantizes the calculated result with the minimum value of the quantizing steps of the applicable system (at step 305).

Example of the above-described "applicable system" are a system according to the MPEG (Moving Picture Experts Group) standard, a system according to the JPEG (Joint Photographic Experts Group) standard, and so forth.

The code amount controlling portion 17 calculates code amounts of data (generated code amount) corresponding to the quantized results of the second quantizing portion 15 and the third quantizing portion 16 (at step 306).

The code amount controlling portion 17 compares the code amount generated by the second quantizing portion 15 and the code amount generated by the third quantizing portion 16 for each divided element (region of the element) and determines whether there is a large difference between the generated code amounts (at step 307).

The code amount controlling portion 17 predicts the generated code amount of the original picture corresponding to the code amount of the picture reduced by the picture dividing portion 13 (at step 308). In addition, the code amount controlling portion 17 determines an optimum quantizing step for each element corresponding to the target compressing ratio, the target encoding bit rate, and the determined result of step 307 (at step 309).

The code amount controlling portion 17 supplies the value of the optimum quantizing step determined at step 309 to the first quantizing portion 11 (at step 310).

Next, with reference to FIGS. 2(a) to 2(c), the conception of the process in the data compressing system according to the embodiment of the present invention will be described.

FIG. 2(a) is a schematic diagram showing an original picture. Referring to FIG. 2(a), a person in disposed at the center portion of the picture, whereas the background of the person is a wall.

FIG. 2(b) is a schematic diagram showing a reduced picture of the original picture shown in FIG. 2(a). The reduced picture is further divided into several elements (16 elements).

FIG. 2(c) is a schematic diagram showing a result of the code amount comparing and determining step (at step 307 of FIG. 3). The calculated result of the DCT calculation (performed by the second DCT calculating portion 14) for each reduced and divided picture element is supplied to the second quantizing portion 15 and the third quantizing portion 16. Thereafter, the code amounts generated by the second quantizing portion 15 and the third quantizing portion 16 are compared for each element by the code amount controlling portion 17. In FIG. 2(c), an element with "X" represents that "the difference between generated code amounts is small", whereas an element with tryst represents that "the difference between generated code amounts is large".

The code amount controlling portion 17 predicts all the generated code amount of the reduced picture shown in FIG. 2(b). For example, the code amount controlling portion 17 predicts a current element of a current frame according to compare a current element of the current frame with a preceding element of a preceding frame. In addition, the code amount controlling portion 17 determines an optimum quantizing step for each element corresponding to the target compressing ratio, the target encoding bit rate, and information representing whether or not each element is X or Y (see FIG. 2(c)).

In the case of an X element, even if the quantizing step is varied, the code amount does not vary. In other words, even if the quantizing step is not decreased, a proper picture quality can be accomplished. Thus, the quantizing step of the X element is designated to a large value of the quantizing steps used for the applicable system.

In contrast, in the case of a Y element, when the quantizing step is varied, the generated code amount largely varies. In other words, when the quantizing step is decreased to a small step, the picture quality is improved. Thus, the quantizing step of the Y element is designated to a small value of quantizing steps used for the applicable system.

For example, suppose a picture of which a person is disposed at the center portion and the background thereof is a wall. In this case, an element corresponding to the wall is X in FIG. 2(c), whereas an element corresponding to a person is Y in FIG. 2(c). The generated code amount of the wall is small due to the picture feature. Thus, the code amount controlling portion 17 increases the quantizing step of the region of the wall as the X element and correspondingly decreases the quantizing step of the region of the wall as the Y element so as to increase the generated code amount and improve the picture quality.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data compressing system, comprising:

a first DCT calculating portion for performing a DCT calculation for an original picture;

a first quantizing portion for quantizing a calculated result of said first DCT calculating portion with an optimum quantizing step a variable length encoding portion for inputting the quantized result of the first quantizing portion, and counting a valid coefficient and a run number of "0" values corresponding to the quantized result of said first quantizing portion and outputting a variable length code corresponding to the counted result;

a picture dividing portion for reducing the original picture and dividing it into several elements;

a second DCT calculating portion for performing a DCT calculation for the elements divided by said picture dividing portion;

a second quantizing portion for quantizing a calculated result of said second DCT calculating portion with the maximum value of quantizing steps of an applicable system;

a third quantizing portion for quantizing the calculated result of said second DCT calculating portion with the minimum value of the quantizing steps of the applicable system; and a code amount controlling portion for obtaining code amounts of data quantized by said second quantizing portion and said third quantizing portion, determining the optimum quantizing step of said first quantizing portion corresponding to a difference of the code amounts generated by said second quantizing portion and the code amounts generated said third quantizing portion, and controlling said first quantizing portion with the optimum quantizing step.

2. The data compressing system as set forth in claim 1, wherein the applicable system with the maximum value and the minimum value considered in said second quantizing portion and said third quantizing portion is a system corresponding to MPEG standard.

3. The data compressing system as set forth in claim 1, wherein the applicable system with the maximum value and the minimum value considered in said second quantizing portion and said third quantizing portion is a system corresponding to JPEG standard .

4. A data compressing system, comprising:

a first DCT calculating portion for performing a DCT calculation for an original picture;

a first quantizing portion for quantizing a calculated result of said first DCT calculating portion with an optimum quantizing step;

a variable length encoding portion for inputting the quantized result of said first quantizing portion, and counting a valid coefficient and a run number of "0" values corresponding to the quantized result of said first quantizing portion and outputting a variable length code corresponding to the counted result;

a picture dividing portion for reducing the original picture and dividing it into several elements;

a second DCT calculating portion for performing a DCT calculation for the elements divided by said picture dividing portion;

a second quantizing portion for quantizing a calculated result of said second DCT calculating portion with the maximum value of quantizing steps of an applicable system;

a third quantizing portion for quantizing the calculated result of said second DCT calculating portion with the minimum value of the quantizing steps of the applicable system; and a code amount controlling portion for obtaining code amounts of data quantized by said second quantizing portion and said third quantizing portion, determining whether or not there is a large difference between the code amount generated by said second quantizing portion and the code amount generated by said third quantizing portion for each of the elements divided by said picture dividing portion.

5. The data compressing system as set forth in claim 1, wherein the applicable system is a system for maintaining the compressing ratio and the encoding bit rate constant.

6. The data compressing system as set forth in claim 1, wherein said variable length encoding portion includes:

a zigzag scanning circuit for scanning data from low order coefficients to high order coefficients corresponding to an output signal of said first quantizing portion so as to obtain one-dimensional data and transform the one-dimensional data into a two-dimensional data with a run number of "0" values and a valid value; and a Huffman encoding circuit for encoding the two-dimensional data into a Huffman code.

* * * * *